April 28, 1953  A. J. HUCK  2,636,959
TEMPERATURE CONTROL UNIT
Filed April 10, 1950  2 SHEETS—SHEET 2
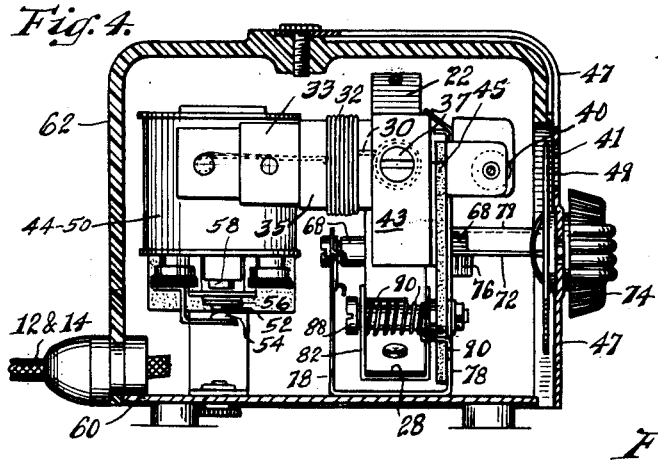
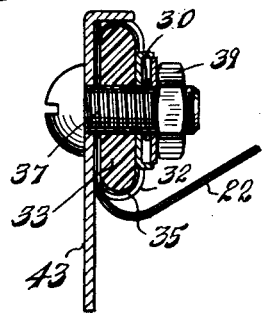
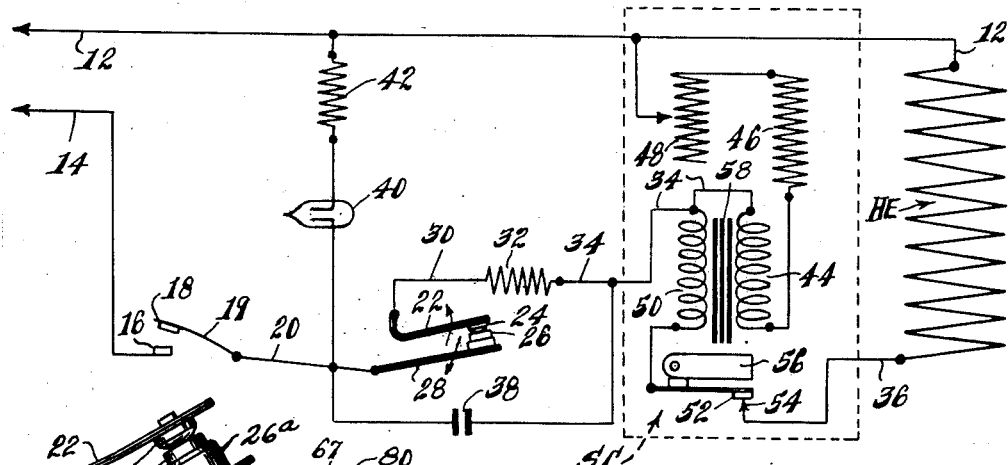
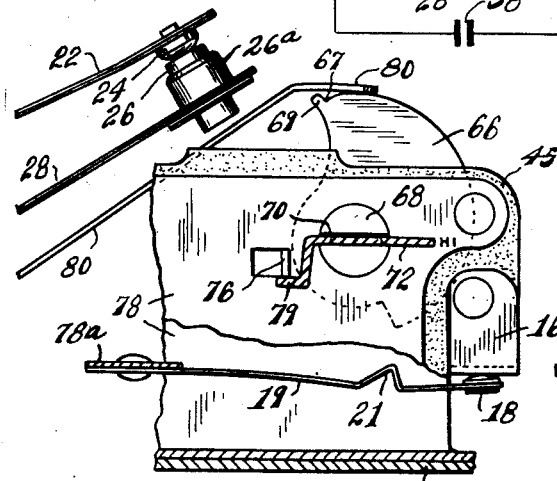
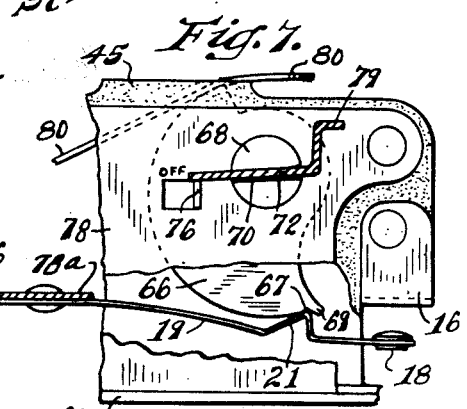
INVENTOR.
Alfred J. Huck.
BY Bair, Freeman & Molinare
Att'ys.

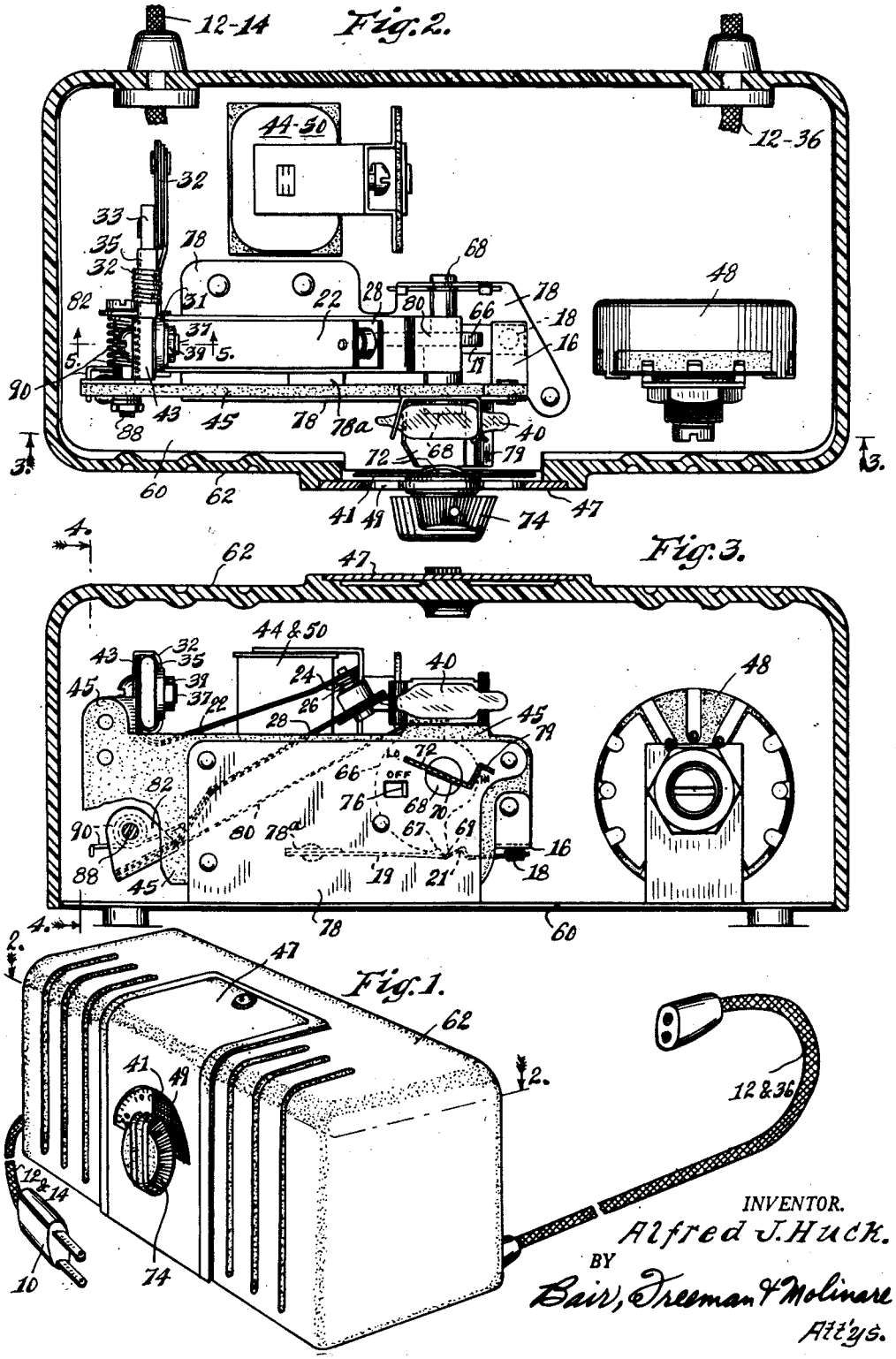

Patented Apr. 28, 1953

2,636,959

UNITED STATES PATENT OFFICE 2,636,959

TEMPERATURE CONTROL UNIT

Alfred J. Huck, St. Louis, Mo., assignor to Knapp-Monarch Company, St. Louis, Mo., a corporation of Delaware Application April 10, 1950, Serial No. 155,073

3 Claims. (Cl. 200—122)

This invention relates to a temperature control unit of the general character shown in my copending applications, Serial No. 772,678, filed September 8, 1947, and Serial No. 36,959, filed July 3, 1948, both now abandoned, the present application being a continuation-in-part of said two copending applications. The temperature control unit herein disclosed is of the "anticipating" type, that is, a thermostat is mounted in a control housing remote from an electric blanket, heating pad or the like, the temperature of which is to be controlled in accordance with the control unit.

One object of the invention is to provide a remote control unit of this general character which cycles at a relatively high temperature due to an electrically operated thermostat heater incorporated in the construction of the thermostat and having no thermal relation to the blanket or other electrical appliance controlled thereby, the thermostat being adjustable to different temperature settings and maintaining the blanket at a substantially constant temperature somewhat lower than the temperature of the thermostat itself.

Another object is to provide a thermostat which anticipates rise and fall in temperature of the blanket by providing a heat bridge across which heat is permitted to flow in such manner that the thermostat lags behind the temperature of its thermostat heater, the lag being increased by including a mass that is first heated by the thermostat heater before the temperature thereof is transmitted through the heat bridge to the bimetal element in the thermostat.

Still another object is to provide a heat bridge which delays the heat from the thermostat heater to the bimetal during an approaching "on" cycle and stores heat from the bimetal heater for slow deliverance to the bimetal to thereby delay cooling of the bimetal during an approaching "off" cycle.

A further object is to provide a temperature control unit wherein a thermal cycling switch acts a "percentage on" type of control switch for controlling the current that flows through the heating element of a blanket or the like.

Still a further object is to provide a circuit arrangement wherein a cycling type of control switch includes inherent in its design a means to compensate for ambient temperature so that a warming blanket or the like controlled by the switch unit will be maintained at a comfortable temperature regardless of rise or fall in the room temperature.

An additional object is to provide a temperature control unit including a cycling switch and means to compensate for room temperature, the switch and the means each having a bimetal element which elements are separate from each other so that the cycling switch element may operate at a higher and more reliable temperature and control the cycling within relatively close limits not possible if operated at room temperature, the room temperature responsive element then modifying the action of the cycling switch in accordance with room temperature so that the temperature of the blanket is maintained at different desirable values regardless of rise or fall in room temperature surrounding the blanket and the control unit.

With these and other objects in view, my invention consists in the construction, arrangement and combination of the various parts of my temperature control unit, whereby the objects contemplated are attained, as hereinafter more fully set forth, pointed out in my claims, and illustrated in the accompanying drawings, wherein:

Figure 1 is a perspective view of a temperature control unit embodying my present invention.

Figure 2 is an enlarged horizontal sectional view thereof as taken on the line 2—2 of Figure 1.

Figure 3 is a vertical sectional view taken on the line 3—3 of Figure 2.

Figure 4 is a vertical sectional view taken on the line 4—4 of Figure 3.

Figure 5 is an enlarged sectional view on the line 5—5 of Figure 2; and

Figure 6 is an electro-diagrammatic view of the circuit used in connection with the temperature control unit disclosed.

Figures 7 and 8 are enlarged vertical sectional views of the control unit shown in Figure 3.

On the accompanying drawings I have used the reference numeral 10 to indicate a service plug from which wires 12 and 14 extend. Referring to the diagram in Figure 6, the wire 12 extends directly to the heating element HE of an electric blanket or the like and the wire 14 extends to an "on-off" switch having control contacts 16 and 18.

The contact 18 is connected by a wire 20 to a compensator bimetal 28 carrying a contact 26. The contact 26 is adapted to cooperate with a contact 24 on a timer bimetal 22 which is connected to an end 30 of a timing bimetal heater 32. From the heater 32, a wire 34 extends to a secondary control SC and a wire 36 extends therefrom to the heating element HE for completing the circuit.

A condenser 38 shunts the contacts 24 and 26 and the heater 32. An indicator light such as a neon bulb 40 is connected across the wires 12 and 20 with a resistor 42 in series to cut down the voltage to the bulb 40.

The secondary control SC includes a voltage coil 44, a fixed resistor 46 and a variable resistor 48 across the line from the wire 12 to the wire 34. A series or current coil 50 is connected between the wires 34 and 36 and is in series with secondary control contacts 52 and 54. The contacts 52 and 54 are normally engaged and are adapted to be separated by the attraction of an armature 56 carrying the contact 52 by a core 58 on which the coils 44 and 50 are wound.

The elements 44 to 58 constitute a secondary control in the event of damage or other malfunctioning of the temperature control unit and is operable to de-energize the warming blanket or device controlled by the unit and maintain it in the de-energized condition. The secondary control, in other words, is a "safety control" and forms no part of my present invention, it being the subject matter of a copending application, Serial No. 44,607, filed August 17, 1948, now Patent No. 2,592,525, dated April 15, 1952, and being claimed therein.

Having described the electrical elements of my temperature control unit, I will now refer to the physical construction shown in Figures 1 to 5. The various elements of the control unit thus far described are mounted on a base plate 60 and covered by a housing 62 which arrangement permits room temperature to act sufficiently by thermal conduction through the base plate and the housing to actuate the compensator bimetal 28.

The contact 18 (see Figure 8) is mounted on a switch blade 19 which is controlled by a cam 66. The switch blade 19 is mounted on an ear 78a extending from a supporting bracket 78 and insulated therefrom. The cam 66 is mounted on a shaft 68 having a slot 70 in which a blade 72 extending from a control knob 74 is engaged. The blade when rotated its limit in a counterclockwise direction is in the "off" position shown in Figure 7 and engages a stop lug 76 formed on the supporting bracket 78 which is secured to the base 60. The position shown in Figure 3 is with the switch 16—18 turned on and the control unit adjusted for low heat. The knob 74 can be rotated about 180 degrees clockwise for adjusting the control unit for a progressively higher heat and in the high heat position (Figure 8) an extension 79 of the blade 72 engages the stop lug 76.

The high-heat adjustment just referred to is accomplished by the cam 66 progressively raising a spring blade 80 which is connected with a bracket 82 pivoted on a bolt 88 and provided with a spring 90 tending to rotate the spring blade 80 in a clockwise direction in Figure 3 and against the cam 66. The compensator bimetal 28 is carried by the bracket 82 and accordingly its contact 26 is progressively moved into tighter engagement with the contact 24 on the timer bimetal 22 as the knob 74 and the cam 66 are adjusted for a higher heat.

The cam 66 has a notch 67 cooperating with a hump 21 on the switch blade 19 at the "off" end of the adjustment range, a projection 69 next to the notch 67 serving to depress the hump as the cam is rotated counter-clockwise from the Figure 3 position and thereby adjust the switch 16—18 to the "off" position when the hump 21 snaps into notch 67 as in Figure 7. The heater 32 for the bimetal 22 is wound around a layer of mica 35 on a heat bridge element 33. This element may consist of a relatively thick bar of brass or the like in thermal contact with the bimetal element 22 as shown in Figure 5, the two being assembled in relation to a bracket 43 mounted on an insulating plate 45 which in turn is mounted on the bracket 78. The means of mounting consists of a screw 37 through the bracket, the bimetal element and the heat bridge element as shown in Figure 5, a nut 39 being used to retain the bolt in position and to clamp the end 30 of the heater 32 to the bimetal element.

Mounted on the blade 72 (see Figure 4) for rotation therewith is a translucent dial 41 provided with suitable indicia as shown in Figure 1 through which the light of the indicator bulb 40 shines so that the position of adjustment of the control unit can be readily determined at night. A cover plate 47 on the housing 62 is provided with an arc-shaped opening 49 through which the dial 41 may be observed as the knob 74 is rotated.

*Practical operation*

In the operation of the temperature control unit disclosed, the parts are in the normal position when cold as shown in Figure 3. The control is in the "off" position in Figure 7 so that current cannot flow from the line wire 14 across the contacts 16 and 18. Arrows across the bimetal elements 22 and 28 in Figure 6 indicate the direction that these elements warp when heated.

When the control knob 74 is rotated clockwise from the position of Figure 3, first the contacts 16 and 18 are engaged for establishing a circuit from 14 through 16, 18, 19, 20, 28, 26, 24, 22, 30, 32, 34, 50, 52, 54 and 36 to the heating element HE, the current returning through the wire 12 to the source of supply. The heating element heats up and so does the heater 32. The heat in 32 passes by conduction through the heat bridge element 33 to the bimetal element 22 to cause its contact 24 to move in a direction to lessen the pressure against the contact 26. The response of the bimetal element 22 to the heat of the heater 32, however, is laggard due to the element 33 constituting a heat bridge and being preferably of considerable mass so as to require a period of heat absorption before it can warp the element 22 sufficiently to open the contacts 24 and 26.

When the warping force in 22 is sufficient, it will separate the contact 24 from the contact 26 and this will be accomplished with slight snap action inasmuch as the contact 26 is a relatively small magnet set in a cup 26a as best shown in Figure 8 and the contact 24 is of ferrous material, the two being silver-plated to provide efficient contact surfaces. When the contacts do open, arcing is reduced by reason of the condenser 38 shunting the contacts and the heater.

When the contact 24 disengages the contact 26, the circuit through the heating element HE and the heater 32 is broken so that the bimetal element 22 and the heat bridge 33 may start to cool down.

Since the element 33 has considerable mass its cooling action will be slow so that it will take some time for the contact 24 to re-engage the contact 26. The thermal lag introduced between the heater 32 and the bimetal element 22 by the heat bridge element 33 thus produces a relatively slow cycling of the control unit with the result that the unit continues to repeat the cycles at a speed which periodically energizes the heating element HE at the proper rate to keep it at the desired average temperature for which the control is set. The length of the cycles can be lengthened by raising the leaf spring 80 by means of the cam 66 controlled by the knob 74 as disclosed in Figure 8 as it then takes greater warping force in the element 22 to separate its contact 24 from the contact 26.

When the bimetal element 22 attains a predetermined temperature and consequent relative deflection to a critical point, it begins to oscillate for control purposes at this point which corresponds to the correct blanket temperature as determined by the setting of the control knob 74. Oscillation is produced because at a certain temperature the contact 24 will disengage the contact 26 thus opening the circuit and permitting the heater 32 to cool. The heat bridge element 33 and the bimetal element 22 likewise cool thus re-establishing the circuit by engagement of the contact 24 with the contact 26. The cycle thereupon repeats the same as an electric buzzer or doorbell but the cycle is much slower due to thermal lag between the heater 32 and the bimetal element 22 because the heat must flow through the heat bridge element 33 before reaching the bimetal element.

In connection with a cycling switch of the character disclosed, it is desirable that the cycle be automatically adjusted to follow room temperature conditions. This is accomplished by having the contact 26 mounted on the bimetal element 28 which tends to separate the contact 24 from the contact 26 sooner at high room temperature than at low room temperature, as the tendency for the bimetal element 28 is to warp downwardly upon ambient temperature rise. Such ambient temperature rise thus shortens the "on" cycles in relation to the "off" cycles of the heating element HE when room temperature rises and vice-versa. The bimetal element 28 can be readily tailored to compensate for ambient temperature or even over or under compensate for it if that is desirable. If required, the spring blade 80 can also be made of bimetal for further compensation effect.

The heat bridge element 33 consists of a special mass of particular dimensions and particular thermal characteristics interposed between the bimetal element 22 and its heater 32. This mass of material need not necessarily be of metal but preferably is metal for several reasons. Metal is easily fabricated in various desirable shapes of homogenous masses and is economical to use. Metals are of various types and have a wide range of thermal characteristics. They are also readily available and different metals are comparatively easy to fabricate on the same dies to provide heat bridges having different heat flow characteristics. The heat flow characteristics of metal are relatively constant under widely differing conditions which also make metal preferable. I have found aluminum, brass and nickel-plated steel quite suitable. By using the heat flow bridge element, the thermostat never reaches a state of thermal stability and slow oscillation results as distinguished from rapid oscillation in a buzzer or the like.

By slowly oscillating at the critical point, the bimetal 22 provides a stable blanket temperature and of course the control point may be raised or lowered as desired. The blanket and the control unit are thus in effect two sections of a parallel system with the control unit attaining a predetermined state of equilibrium at a comparatively high temperature such as 195 degrees in the bimetal element 22 while the blanket attains a state of equilibrium at a lower temperature, for instance 80 degrees. By this method comparatively greater variations of bimetal temperature are possible while having low blanket temperatures and a low range of variation of the blanket temperature.

The elements of the secondary control SC in Figure 6 do not enter into the normal operation of the control unit disclosed but the unit SC operates only in an emergency as when the heating element HE is partially short-circuited or open-circuited. The operation of the unit SC is fully disclosed in my copending application, Serial No. 44,607, now Patent No. 2,592,525, dated April 15, 1952, and forms no part of the present invention and accordingly its operation is omitted from the present specification.

Some changes may be made in the construction and arrangement of the parts of my temperature control unit without departing from the real spirit and purpose of my invention, and it is my intention to cover by my claims any modified forms of structure or use of mechanical equivalents which may be reasonably included within their scope.

I claim as my invention:

1. In a temperature control unit of the character disclosed, a cycling temperature responsive element, a room temperature responsive element, said elements being mounted in a housing responsive to room temperature, circuit control contacts carried by said elements for controlling a circuit to a heating element of an electrical appliance, a heater also in said circuit and arranged to heat said cycling temperature responsive element to cause the same to cycle, said heater heating said cycling temperature responsive element to a considerably higher temperature than the room temperature affecting said room temperature responsive element, an elongated heat bridge element having one end heated by said heater and its other end connected with said temperature responsive element for delaying the action of the cycling temperature responsive element in relation to energization of said heater and de-energization thereof whereby said cycling temperature responsive element cycles at a substantially constant and relatively higher temperature than the temperature of the appliance controlled by said temperature control unit.

2. A temperature control unit comprising a temperature responsive element, circuit contacts controlled thereby, a heater in circuit with said contacts, said heater being provided to heat said temperature responsive element to cause the same to cycle, a heat bridge element having said heater wound on one portion thereof and said temperature responsive element contacting another portion thereof spaced from said first portion for delaying the action of the temperature responsive element in relation to energization and de-energization of said heater and to cause the element to anticipate on and off cycles for the heating element of an appliance controlled by said control unit to keep it at a substantially constant temperature relatively lower than the temperature at which said temperature responsive element cycles, and a second temperature responsive element also controlling said contacts and responsive to the ambient temperature of said unit for shortening the on cycles and lengthening the off cycles thereof in proportion to rise in room temperature and vice-versa.

3. In a temperature control unit, a temperature cycling switch comprising contacts for controlling the flow of current to a heater type electric appliance, a pair of thermally responsive elements for opening said contacts upon temperature rise, one of said contacts being magnetic and the other being of ferrous material to provide slight snap action upon separation and engagement thereof, said contacts being normally engaged at temperatures of the electric appliance lower than the desired temperature, a heater in circuit with said contacts and in circuit with the electric appliance, one of said thermally responsive elements responding to the heat of said heater and being cycled thereby at a temperature substantially above both room temperature and the temperature at which the electric appliance cycles, and the other of said thermally responsive elements being subject to temperature ambient to said unit for changing the proportions of the on and off cycles of said control unit depending on room temperature ambient to said unit.

ALFRED J. HUCK.

References Cited in the file of this patent

UNITED STATES PATENTS

| Number | Name | Date |
|---|---|---|
| 1,980,756 | Hoover | Nov. 13, 1934 |
| 2,195,947 | Uhrig | Apr. 2, 1940 |
| 2,311,801 | Winans | Feb. 23, 1943 |
| 2,354,918 | Kearsley | Aug. 1, 1944 |
| 2,383,291 | Cook | Aug. 21, 1945 |
| 2,518,941 | Satchwell et al. | Aug. 15, 1950 |